United States Patent Office 3,222,402
Patented Dec. 7, 1965

---

3,222,402
PREPARATION OF N-ALIPHATIC TRIMETHYLENE DIAMINES
Murray C. Cooperman, Chicago, Ill., assignor to Armour and Company, Chicago, Ill., a corporation of Delaware
No Drawing. Filed Mar. 20, 1962, Ser. No. 181,192
5 Claims. (Cl. 260—583)

This invention relates to the preparation of N-aliphatic trimethylene diamines, and more particularly to a process involving cyanoethylating a fatty amine to obtain an intermediate cyanoethylated product and thereafter hydrogenating the cyanoethylated product to obtain the diamines.

An object of the invention is to provide a process for the preparation of N-aliphatic trimethylene diamines in which a novel proton-transfer catalyst is employed. A further object is to provide a cyanoethylation method in which water is utilized as a proton-transfer catalyst for producing an intermediate in the preparation of a superior final product. Other specific objects and advantages will appear as the specification proceeds.

In one specific embodiment of the invention, a primary fatty amine is heated to a reaction temperature, say, about 70–80° C., with preferably not more than 20% excess acrylonitrile in the presence of a trace and up to 10% water, the percentage being by weight and on the basis of the total charge.

The cyanoethylated product is then reduced to a diamine, using a hydrogenation catalyst and the usual hydrogenation temperature and pressure conditions. The reduction step to the diamine is completed within 1 to 2 hours, as compared with prior practice requiring 5 to 14 hours.

In the cyanoethylation of the primary amine, I prefer to employ about 5–10% excess acrylonitrile, using low temperatures (about 70–85° C.) and up to 10% of water as a catalyst to yield a nearly quantitative conversion to the mono-cyanoethylated intermediate product. Excellent results have been obtained using about 4% by weight of water. As above stated, the intermediate product is reduced in the usual manner for reducing fatty nitriles to yield improved diamines of the order of 95–100% activity.

The foregoing process with the described high yields is accomplished with a 75% reduction in the excess acrylonitrile heretofore employed.

As starting material, any primary fatty amines may be employed. I prefer to employ primary fatty amines derived from fatty acids of coco, tallow, oleyl, and soya origin having from 8 to 18 carbon atoms.

The excess of acrylonitrile employed may extend up to 20% or more, but preferably not above 10% excess. The water employed also may be a trace and up to 10% on a weight basis, the weight being measured on the weight of the total charge, and preferably about 4–5%.

The temperature to which the charge is heated may be any reaction temperature. Normally the temperature is found to be in the range of 50–90° C., and preferably about 70–85° C.

After the cyanoethylation step is substantially complete, the excess unreacted acrylonitrile and most of the water are removed under vacuum before the cyanoethylated product is reduced to the diamine. The foregoing process accomplishes more complete cyanoethylation without any build-up of acrylonitrile polymer products.

By employing water as a proton-transfer catalyst at the lower temperatures, and by utilizing less excess acrylonitrile, the quantitative mono-cyanoethylated product is formed with very little unreacted amine, dicyanoethylated amine, or acrylonitrile polymeric by-products.

The effect of water as a proton-transfer catalyst depends on its available free electron pair. A suggested mechanism for the catalysis is given by Equations 1, 2 and 3:

(1) 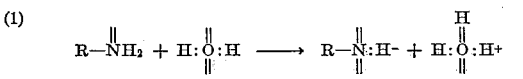

(2) 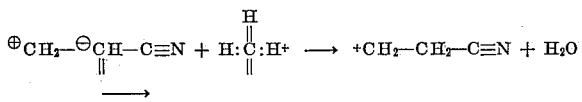

(3) 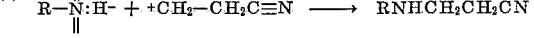

By preparing a better monocyanoethylated intermediate and using a washed catalyst, the reduction step to the diamine was completed within 1–2 hours.

The following examples may be set out as illustrative of the process:

EXAMPLE I

*Preparation of cyanoethylated Armeen CD*

Charge:
  Armeen CD (distilled primary
    fatty amines derived from
    coco) _____ 594 gm. [3 moles].
  Acrylonitrile _____ 175 gm. [3 moles+
                                 10% excess].
  Water _____ 31 gm. [4% B.W.
                                 of charge].

Apparatus:
  A 2,000 ml., 3 neck reaction flask in an electric mantle, and equipped with stirrer, thermometer, dropping funnel and condenser; a Fisher portable vacuum pump.

Method:
  Charge reactor flask with 594 gm. Armeen CD and 31 gm. water. Stir and heat to 70° C. Then add 175 gm. acrylonitrile at a steady rate over 1¼ hours between 70–80° C. The reaction mixture is then stirred an additional 2 hours at 75–85° C. A sample is taken and the lower water layer is taken off. The sample is then dried at 80° C. and 50 mm. vacuum for ½ hour. Analysis showed less than 1% unreacted primary amine and 96+% apparent secondary amine. Since the PA content was less than 1%, the stirring and heating was stopped. Any water that drops down is removed. The batch is connected to a vacuum system and stirred at 80° C. and 50 mm. vacuum cautiously applied for 1 hour. It is then bulked and readied for reduction.

Yield:
  761 gm. light yellow clear liquid at room temperature.

Analysis:
| | Percent |
|---|---|
| PA (200) | 0.88 |
| SA (253) | 96.2 |
| TA | nil |
| Moist. | 0.4 |

The cyanoethylated amine was reduced with Raney nickel under standard conditions normally employed for reducing fatty nitriles.

(6) Stop agitation and allow water to settle for 15–30 minutes and drop free water to sewer.

(7) Cool contents to 100° F. and pull vacuum down to 26–28 inches of mercury over a 15 minute period. Gradually heat content back to 170° F. and maintain for one hour.

The cyanoethylated product is then reduced with Raney nickel under standard conditions.

EXAMPLE III

The following typical experiments are summarized in Table I and in which Runs 1, 2 and 3 are demonstrative of the effectiveness of water for improving the extent and rate of mono-cyanoethylation:

*Table I*

ANALYTICAL RESULTS FOR COMPARATIVE PROCEDURES FOR PREPARATION OF DUOMEENS

| Amine Feed | Conditions for cyanoethylation | | | Analysis of cyanoethylated amine | | | Reductive conditions | | |
|---|---|---|---|---|---|---|---|---|---|
| | Temp., °C. | Percent excess acrylonitrile | Percent water | Percent amine | | | Percent $H_2O$ | Percent Raney [1] | Percent TEAH [2] |
| | | | | 1° | 2° | 3° | | | |
| Armeen TD (Distilled primary fatty amine derived from tallow) | 70–80 | 10 | 0 | 4.7 | 91.7 | nil | | 3 | 0 |
| Armeen TD | 70–80 | 10 | 1 | 2.8 | 95.4 | tr | 0.19 | 1 | 1 |
| Do | 70–80 | 10 | 4 | 0.8 | 95.5 | tr | 1.3 | 1 | 1 |
| Armeen OD (Distilled primary fatty amine derived from oleic) | 70–80 | 10 | 1 | 1.7 | 95.6 | nil | | 1 | 1 |
| Armeen CD (Distilled primary fatty amine derived from coco) | 70–80 | 10 | 4 | 0.9 | 96.2 | nil | | 1 | 1 |

| Amine Feed | Reductive conditions | | | Diamine analysis | | | | | | |
|---|---|---|---|---|---|---|---|---|---|---|
| | Temp., °C. | Pressure, p.s.i.g. $H_2$ | Hours | Percent amine | | | Total | N.E. | I.V. | Color, Gardner |
| | | | | 1° | 2° | 3° | | | | |
| Armeen TD (Distilled primary fatty amine derived from tallow) | 115–120 | 300 | 3 | 43.5 | 48.0 | 1.6 | 93.1 | 170 | 28 | 2–3 |
| Armeen TD | 140–145 | 200 | 1¾ | 46.9 | 47.7 | 1.9 | 96.5 | 164 | 36 | 3 |
| Do | 140–145 | 200 | 1½ | 50.3 | 47.8 | 2.2 | 100.3 | 163 | 36 | 2–3 |
| Armeen OD (Distilled primary fatty amine derived from oleic) | 140–145 | 200 | 1¼ | 51.3 | 44.0 | 1.7 | 96.0 | 166 | 69 | 3–4 |
| Armeen CD (Distilled primary fatty amine derived from coco) | 140–145 | 200 | 1½ | 46.9 | 46.6 | 2.2 | 95.7 | 133 | | 3–4 |

[1] 50% Ni in methanol.  [2] Tetraethanol ammonium hydroxide.

EXAMPLE II

A pilot plant cyanoethylation was carried out as follows:

Charge to a 10 gallon hydrogenation autoclave, the following reagents:

| | Lbs. |
|---|---|
| Armeen TD (Distilled primary fatty amine derived from tallow) | 48 |
| Acrylonitrile | 10 |
| Water | 2.3 |

The conditions for cyanoethylation are as follows:

(1) Charge the amine and water to the reactor and heat to 160° F.

(2) Charge reactor twice with nitrogen at 15–20 p.s.i.g., leaving one pound of pressure on autoclave after second charge.

(3) Add acrylonitrile to reactor at such a rate that all will be added in 1½ hours, maintaining temperature between 160–175° F.

(4) Digest the reactants at 160–175° F. for an additional 1–2 hours.

(5) Sample reactor and determine primary and secondary amine content. When the value is in excess of 95% and the primary amine is less than 1%, stop agitation.

EXAMPLE IV

Charge:
| | |
|---|---|
| Cyanoethylated Armeen TD (distilled tallow amine) gm | 300 |
| Raney nickel catalyst gm | 3 |
| Ammonia and hydrogen gas | -- |

Apparatus:
  1,000 ml. Magnedash autoclave.

Three experimental runs were made. The unit was charged with 300 gm. cyanoethylated Armeen TD and the Raney nickel catalyst. The unit was flushed 3 times with $NH_3$ gas and pressure was set to 25 p.s.i.g. at 45° C. It was then charged to 200 p.s.i.g. total pressure with hydrogen gas and heated at 140–150° C. while maintaining the total hydrogen pressure. Within 1–2 hours, the reduction was complete.

In a fourth experiment, a high pressure run was carried out in a similar manner by initially charging with 400 p.s.i.g. $NH_3$ gas at 90° C. and running the reaction to 800 p.s.i.g. with hydrogen at 125° C. A good quality Duomeen T (N-tallow trimethylene diamine) was again prepared although the reduction time required 5 hours.

The results of 4 experiments using $NH_3$ as suppressant are illustrated in Table II.

Table II
USE OF AMMONIA AS SUPPRESSANT FOR DIAMINES

| Experiment No. | Percent Raney nickel | Ammonia press., p.s.i.g. | Hydrogen press., p.s.i.g. | Temp., °C. | Reaction time, hrs. | Diamine analysis | | | | | | Gardner Color | Gas chromatography, percent composition |
|---|---|---|---|---|---|---|---|---|---|---|---|---|---|
| | | | | | | Percent amine | | | Total | N.E. | I.V. | | |
| | | | | | | 1° | 2° | 3° | | | | | |
| (1) 716-95 | 1 | 25 | 175 | 140-150 | 2 | 48.0 | 45.8 | 2.1 | 95.9 | 167.0 | 33 | 3-4 | Low boilers, 1.2. Primary amines, 7.2. Diamines, 91.4. |
| (2) 716-97 | 1 | 25 | 175 | 140-150 | 2 | 47.5 | 46.5 | 1.5 | 95.5 | 166.5 | 35 | | Low boilers, 1.2. Primary amines, 8.2. Diamines, 90.6. |
| (3) 716-103 | 1 | 25 | 175 | 140-150 | 2 | 46.5 | 47.5 | 1.3 | 95.3 | 166.7 | 34 | | Low boilers, 1.0. Primary amines, 7.5. Diamines, 91.4. |
| (4) 697-109 | 1 | 400 | 400 | 120-130 | 5 | 47.9 | 45.5 | 1.1 | 94.5 | 168.0 | 38 | 4 | Primary amines, 6.4. Diamines, 93.4. |
| (5) 515-56 | 1 | 100 | 700 | 120-130 | 1 | 49.0 | 49.5 | 0.9 | 99.4 | 160.5 | 30 | 3-4 | Low boiler, 0.1. Primary amines, 2.4. Diamines, 97.5. |
| (6) 515-63 | 1 | 65 | 435 | 140-150 | 1.10 | 46.0 | 51.4 | 0.8 | 98.2 | 162 | 30.7 | 3-4 | Low boiler, 0.2. Primary amines, 3.4. Diamines, 96.4. |
| (7) 515-67 | 0.25 | 65 | 435 | 140-150 | 1.25 | 49.7 | 47.2 | 1.0 | 97.9 | 162.5 | 32.7 | 4-5 | Low boiler, 0.14. Primary amines, 3.50. Diamines, 96.40. |
| (8) 515-70 | 0.25 | 150 | 1,150 | 140-150 | 1.00 | 48.0 | 49.5 | 0.7 | 98.2 | 162 | 31.2 | 4 | Low boiler, 0.76. Primary amines, 2.90. Diamines, 96.31. |

While in the foregoing specification, I have set forth specific procedure in considerable detail for the purpose of illustrating the invention, it will be understood that such details may be varied widely by those skilled in the art without departing from the spirit of my invention.

I claim:

1. In a process for the preparation of N-aliphatic trimethylene diamines, wherein said aliphatic group contains from 8 to 18 carbon atoms, in which primary aliphatic amines containing from 8 to 18 carbon atoms are mono-cyanoethylated and after substantial removal of water the mono-cyanoethylated product reduced by catalytic hydrogenation to said diamines; the improvement consisting of forming a nearly quantitative yield of said mono-cyanoethylated product by heating to a temperature of about 50–90° C. a primary aliphatic amine containing from 8 to 18 carbon atoms, with water as a proton-transfer catalyst and an excess of acrylonitrile, said water being present in the range from a trace to less than 20% by weight based on the total weight of the reactants, and said acrylonitrile being employed in less than 20% molar excess.

2. The process of claim 1 in which the water is about 1–10%.

3. The process of claim 1 in which the water proton-transfer catalyst is about 4–5%.

4. The process of claim 1 in which the excess of acrylonitrile is 5–10%.

5. The process of claim 1 in which the temperature range is about 70–85° C.

References Cited by the Examiner
UNITED STATES PATENTS 1,992,615  2/1935  Hoffmann et al. _____ 260—583

OTHER REFERENCES

Taylor et al.: "Journ. Am. Chem. Soc.," vol. 81, (1959), pp. 5333 to 5335.

CHARLES B. PARKER, *Primary Examiner.*